(12) United States Patent
Terui et al.

(10) Patent No.: US 8,300,428 B2
(45) Date of Patent: Oct. 30, 2012

(54) RESONANT POWER CONVERSION APPARATUS

(75) Inventors: Hiromitsu Terui, Niiza (JP); Hideki Asuke, Niiza (JP); Hideharu Takano, Niiza (JP); Masayoshi Yamamoto, Matsue (JP)

(73) Assignees: Sanken Electric Co., Ltd., Nizza-shi (JP); National University Corporation Shimane University, Matsue-shi (JP)

( * ) Notice: Subject to any disclaimer, the term of this patent is extended or adjusted under 35 U.S.C. 154(b) by 228 days.

(21) Appl. No.: 12/861,327

(22) Filed: Aug. 23, 2010

(65) Prior Publication Data
US 2011/0051474 A1    Mar. 3, 2011

(30) Foreign Application Priority Data
Aug. 31, 2009   (JP) .................. 2009-199505

(51) Int. Cl.
  *H02M 3/335* (2006.01)
  *H02M 7/44* (2006.01)
(52) U.S. Cl. ............ 363/21.02; 363/21.03; 363/97; 363/98; 363/131; 363/132; 363/133; 363/134
(58) Field of Classification Search ........... 363/21.02, 363/21.03, 97, 98, 131, 132, 133, 134
See application file for complete search history.

(56) References Cited

U.S. PATENT DOCUMENTS

| | | | | |
|---|---|---|---|---|
| 4,365,171 A | * | 12/1982 | Archer | 327/478 |
| 4,785,387 A | * | 11/1988 | Lee et al. | 363/21.03 |
| 4,857,822 A | * | 8/1989 | Tabisz et al. | 323/282 |
| 5,521,807 A | * | 5/1996 | Chen et al. | 363/21.04 |
| 5,815,380 A | * | 9/1998 | Cuk et al. | 363/16 |
| 5,872,705 A | * | 2/1999 | Loftus et al. | 363/21.06 |
| 5,886,508 A | * | 3/1999 | Jutras | 323/267 |
| 5,963,438 A | * | 10/1999 | Chen | 363/21.07 |
| 6,061,254 A | * | 5/2000 | Takegami | 363/21.08 |
| 6,304,463 B1 | * | 10/2001 | Krugly | 363/21.06 |
| 6,317,341 B1 | * | 11/2001 | Fraidlin et al. | 363/56.09 |

(Continued)

FOREIGN PATENT DOCUMENTS

EP    1 037 369 A2    9/2000

(Continued)

OTHER PUBLICATIONS

Extended European Search Report issued Nov. 9, 2010, in Patent Application No. 10173638.7.

(Continued)

*Primary Examiner* — Bao Q Vu
(74) *Attorney, Agent, or Firm* — Oblon, Spivak, McClelland, Maier & Neustadt, L.L.P.

(57) ABSTRACT

A resonant power conversion apparatus includes a transformer T1 having a primary winding n1, a secondary winding n2, a tertiary winding n3, and a reset winding nR, a series circuit of switches S1 and S2, a capacitor Cr1 and diode D1 to the switch S1, a capacitor Cr2 and diode D2 to the switch S2, a series circuit of the winding n1 and a diode Dn1, a series circuit of the winding nR and a diode DR, a reactor Lr connected between a connection point of the switches S1 and S2 and a connection point of the windings n2 and n3, a switch S10 connected between the DC power source and the winding n2, a switch S20 connected between the DC power source and the winding n3, and a controller 10 configured to perform a zero-voltage switching operation of the switches S1 and S2.

6 Claims, 12 Drawing Sheets

U.S. PATENT DOCUMENTS

| | | | |
|---|---|---|---|
| 6,473,318 B1 * | 10/2002 | Qian et al. | 363/21.16 |
| 6,507,174 B1 * | 1/2003 | Qian | 323/222 |
| 6,512,352 B2 * | 1/2003 | Qian | 323/282 |
| 6,621,718 B1 * | 9/2003 | Malik et al. | 363/26 |
| 6,760,236 B2 * | 7/2004 | Hsieh | 363/21.08 |
| 7,095,638 B2 * | 8/2006 | Uusitalo | 363/97 |

FOREIGN PATENT DOCUMENTS

| | | |
|---|---|---|
| EP | 1 037 369 A3 | 9/2000 |
| JP | 8-340676 | 12/1996 |

OTHER PUBLICATIONS

Hisanori Morii, et al., "Capacitor-Less Auxiliary Resonant Commutated Pole (ARCP) Voltage Source Soft Switching Inverter suitable for EV", Power Electronics and Applications, XP 31541389, Sep. 8, 2009, pp. 1-8.

M. Yoshida, et al., "Active Resonant Leg-Link Snubber-Assisted Three Phase Soft Commutation PFC Converter and Its Practical Evaluations", Industrial Electronics Society, vol. 4, XP 10569213, Oct. 22, 2000, pp. 2660-2665.

Frederick R. Salberta, et al., "An Improved Control Strategy for a 50-kHz Auxiliary Resonant Commutated Pole Converter", Proceedings of the $32^{nd}$ Intersociety Energy Conversion Engineering Conference. Aerospace Power Systems and Technologies, vol. 1, XP 10269028, Jul. 27, 1997, pp. 332-336.

J. D. Herbst, et al., "Experimental Results and Design Guidelines Derived from the Testing of a 2 MW, 250 Hz, Auxiliary Resonant Commutated Pole Bi-Directional Converter", Applied Power Electronics Conference and Exposition, XP 31253407, Feb. 24, 2008, pp. 1240-1246.

* cited by examiner

FIG. 11

RESONANT POWER CONVERSION APPARATUS

BACKGROUND OF THE INVENTION

1. Field of the Invention

The present invention relates to a resonant power conversion apparatus applicable to, for example, a hybrid vehicle inverter and an electric vehicle inverter.

2. Description of the Related Art

Among power conversion apparatuses, the resonant power conversion apparatus is known to be capable of reducing a switching loss. A typical example of the resonant power conversion apparatus is an auxiliary resonant commutated pole three-phase voltage inverter that reduces a switching loss by soft-switching switches through an auxiliary resonant circuit that performs resonant operation.

Figure 1:
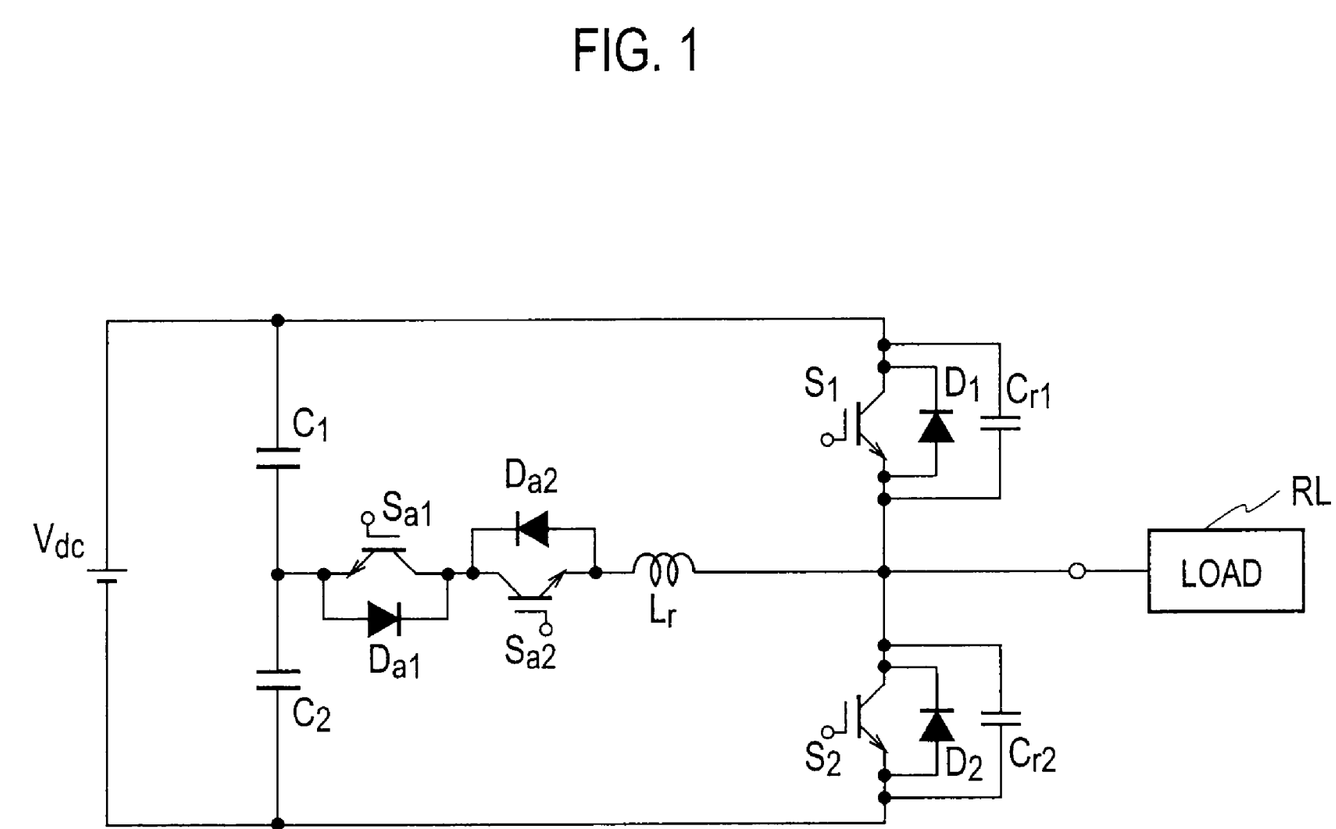
FIG. 1 is a circuit diagram illustrating a one-phase portion of an auxiliary resonant commutated pole three-phase voltage inverter according to a related art.

FIG. 1 is a circuit diagram illustrating a one-phase portion of an auxiliary resonant commutated pole three-phase voltage inverter according to a related art disclosed in Japanese Unexamined Patent Application Publication No. H08-340676. In FIG. 1, both ends of a DC power source Vdc are connected to a series circuit including capacitors C1 and C2 having the same capacitance. A connection point of the capacitors C1 and C2 generates a voltage that is half a voltage of the DC power source Vdc.

Switches S1 and S2 are insulated gate bipolar transistors (IGBTs) and are connected in series. Both ends of the series circuit of the switches S1 and S2 are connected to the ends of the DC power source Vdc. The switch S1 has a collector and an emitter between which a capacitor Cr1 and a diode D1 are connected. The switch S2 has a collector and an emitter between which a capacitor Cr2 and a diode D2 are connected. A connection point of the switches S1 and S2 is connected to a load RL.

Connected between the connection point of the switches S1 and S2 and the connection point of the capacitors C1 and C2 is a series circuit including a reactor Lr and switches Sa1 and Sa2. The switches S1a and Sa2 form an auxiliary resonant circuit and are connected to diodes Da1 and Da2, respectively.

The switches S1 and S2 carry out a zero-voltage, zero-current turn-ON operation with a resonant current provided by the auxiliary resonant circuit, to greatly reduce a switching loss.

Figure 2:
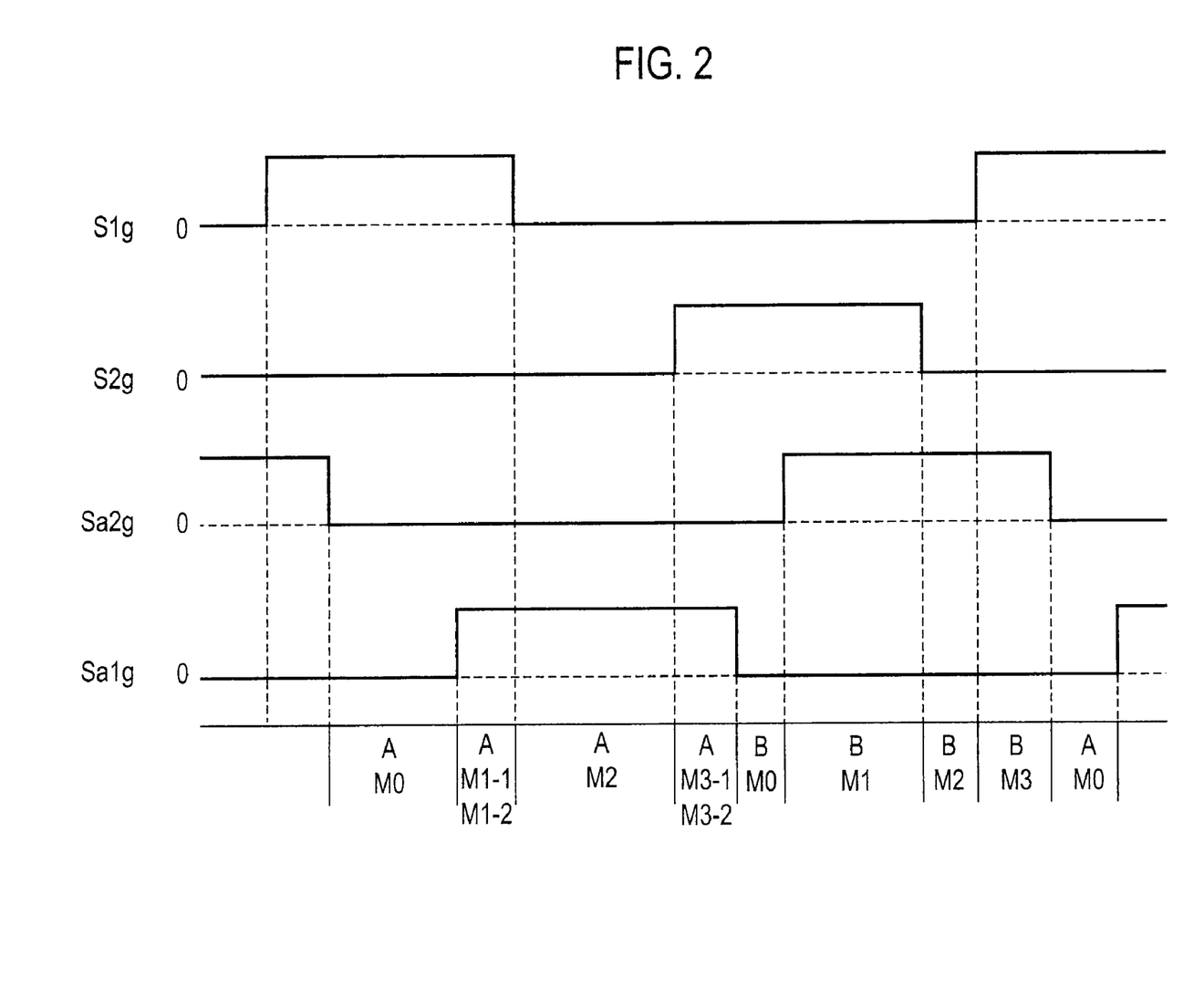
FIG. 2 is a timing chart illustrating operating waveforms of switches in the inverter of FIG. 1.
Figure 3A:
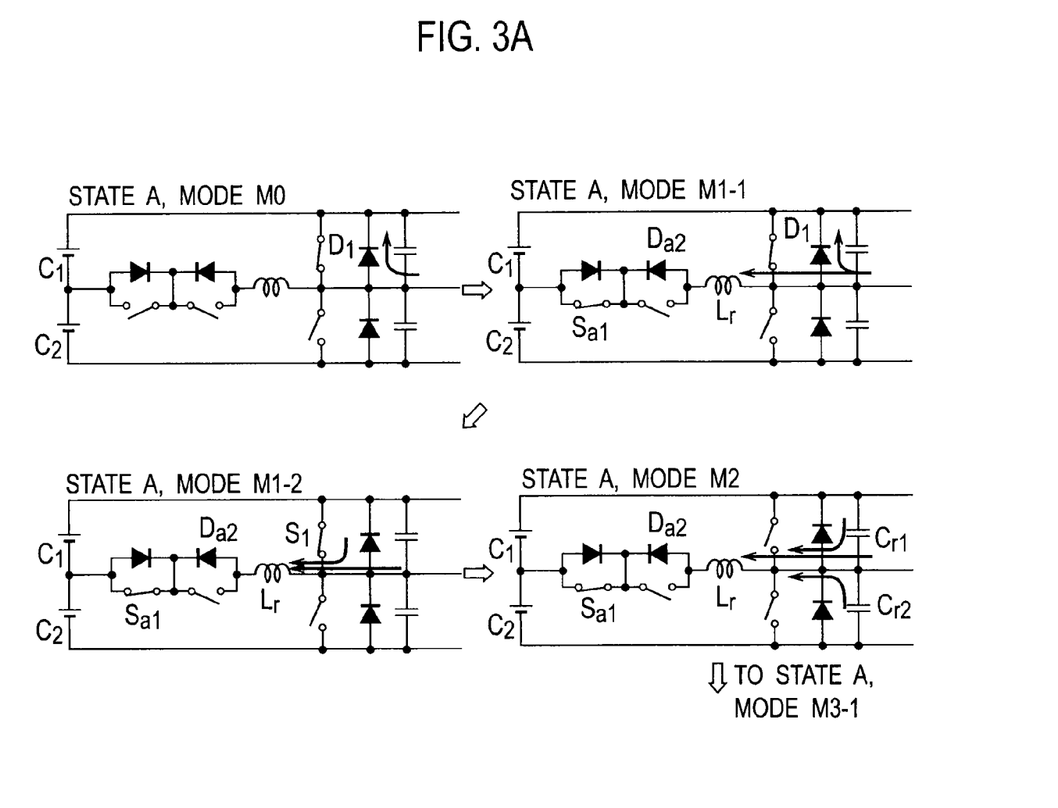
FIG. 3A is a mode transition diagram illustrating mode M0 of state A to mode M2 of state A of the inverter of FIG. 1.
Figure 3B:
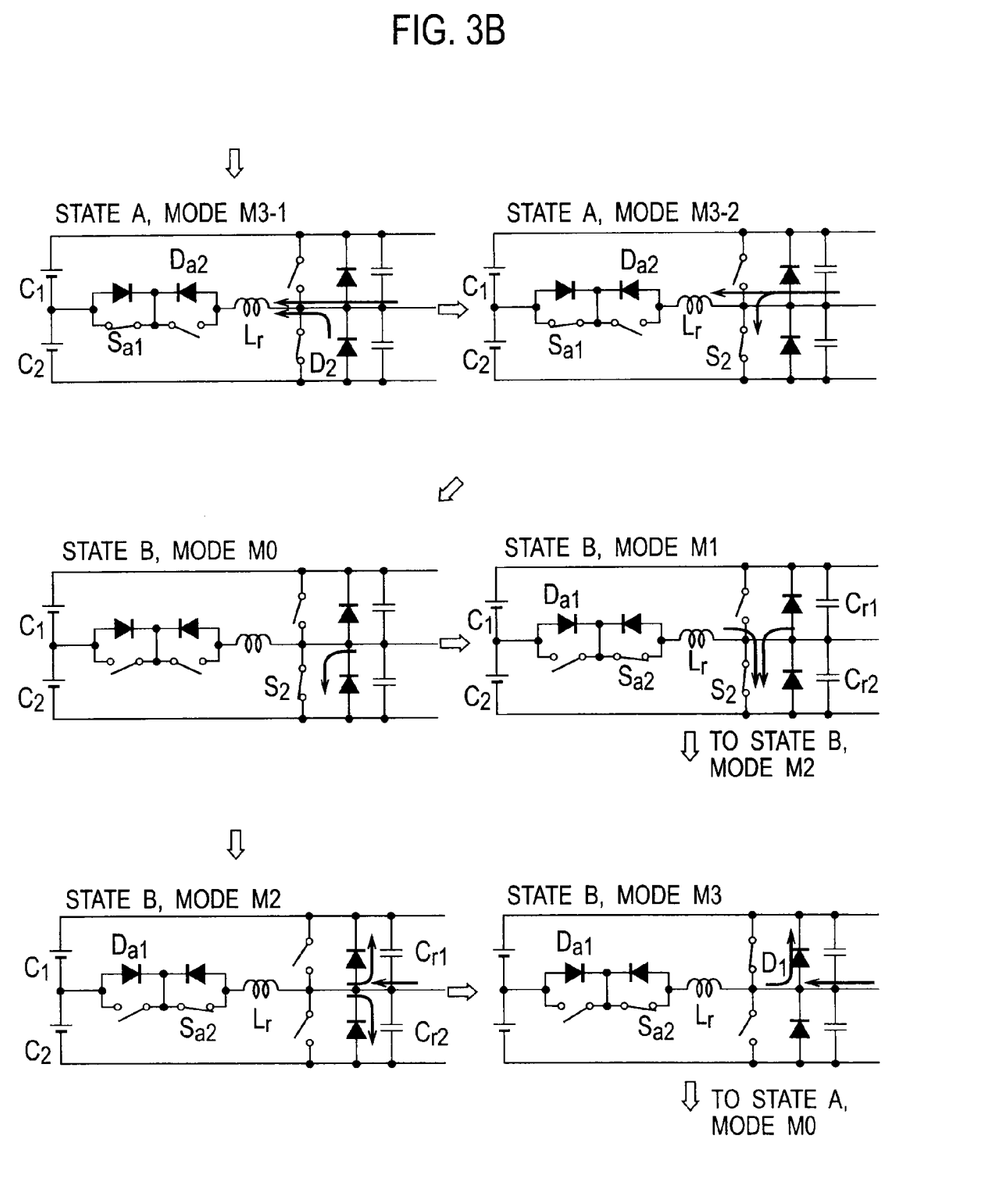
FIG. 3B is a mode transition diagram illustrating mode M3-1 of state A to mode M3 of state B of the inverter of FIG. 1.

FIG. 2 is a timing chart illustrating operating waveforms of the switches in the auxiliary resonant commutated pole three-phase voltage inverter illustrated in FIG. 1. FIG. 3A is a mode transition diagram of the inverter illustrated in FIG. 1 from mode M0 of state A to mode M2 of state A. FIG. 3B is a mode transition diagram of the same from mode M3-1 of state A to mode M3 of state B.

In FIG. 2, S1g is a gate signal applied to a gate of the switch S1, S2g is a gate signal applied to a gate of the switch S2, Sa1g is a gate signal applied to a gate of the switch Sa1, and Sa2g is a gate signal applied to a gate of the switch Sa2.

Operation of the resonant power conversion apparatus of FIG. 1 will be explained with reference to FIGS. 2 to 3B. In mode M0 of state A, the switch S1 is ON and the diode D1 turns on to pass a current through a path extending along the load RL, the diode D1, and the DC power source Vdc.

In mode M1-1 of state A, the gate signal Sa1g turns on the switch Sa1 to divide a current from the load RL. A divided current portion passes through the diode D1 to the DC power source Vdc and the other divided current portion passes through the reactor Lr, diode Da2, and switch Sa1, to accumulate power in the reactor Lr.

In mode M1-2 of state A, a current of the switch S1 and a current of the load RL (each arrowed) pass through the reactor Lr, diode Da2, and switch Sa1, to accumulate power in the reactor Lr.

In mode M2 of state A, the gate signal S1g turns off the switch S1 and the reactor Lr and capacitors Cr1 and Cr2 resonate. At this time, the capacitor Cr2 connected in parallel with the switch S2 is discharged and the capacitor Cr1 connected in parallel with the switch S1 is charged.

In modes M3-1 and M3-2 of state A, the capacitor Cr2 completes the discharge and the diode D2 passes a current. When a drain-source voltage of the switch S2 is zero, the gate signal S2g turns on the switch S2, to realize the zero-voltage switching of the switch S2.

In mode M0 of state B, a current from the load RL passes through the switch S2. In mode M1 of state B, the gate signal Sa2g turns on the switch Sa2, so that a current passing through a path extending along Da1, Sa2, and Lr from the left to the right together with a current of the load RL pass through the switch S2.

In mode M2 of state B, the gate signal S2g turns off the switch S2. Then, the reactor Lr and capacitors Cr1 and Cr2 resonate. At this time, the capacitor Cr1 connected in parallel with the switch S1 is discharged and the capacitor Cr2 connected in parallel with the switch S2 is charged.

In mode M3 of state B, the capacitor Cr1 completes the discharge and the diode D1 passes a current. When a drain-source voltage of the switch 51 is zero, the switch S1 is turned on, to realize the zero-voltage switching of the switch S1.

SUMMARY OF THE INVENTION

The resonant power conversion apparatus according to the related art of FIG. 1, however, contains the voltage dividing point between the capacitors C1 and C2, to divide a voltage of the DC power source Vdc. Potential at the voltage dividing point fluctuates depending on load conditions and temperature and this results in shortening the service life of the capacitors C1 and C2.

The present invention provides a resonant power conversion apparatus capable of securing long service life and high reliability.

According to an aspect of the present invention, the resonant power conversion apparatus includes a transformer having a primary winding, a secondary winding, a tertiary winding connected in series with the secondary winding, and a reset winding connected in series with the primary winding; a first series circuit connected between first and second ends of a DC power source and including a first switch and a second switch; a first capacitor and a first diode that are connected in parallel with the first switch; a second capacitor and a second diode that are connected in parallel with the second switch; a second series circuit connected between the first and second ends of the DC power source and including the primary winding of the transformer and a third diode; a third series circuit connected between the first and second ends of the DC power source and including the reset winding of the transformer and a fourth diode; a reactor connected between a connection point of the first and second switches and a connection point of the secondary and tertiary windings of the transformer; a first auxiliary switch connected between the first end of the DC power source and a first end of the secondary winding of the transformer; a second auxiliary switch connected between the second end of the DC power source and a first end of the tertiary winding of the transformer; and a controller configured to alternately turn on the first and second switches and alternately turn on the first and second auxiliary switches, so that the first and second switches each conduct a zero-voltage switching operation.

DESCRIPTION OF THE PREFERRED EMBODIMENT

Resonant power conversion apparatuses according to embodiments of the present invention will be explained in detail with reference to the drawings.

Embodiment 1

Figure 4:
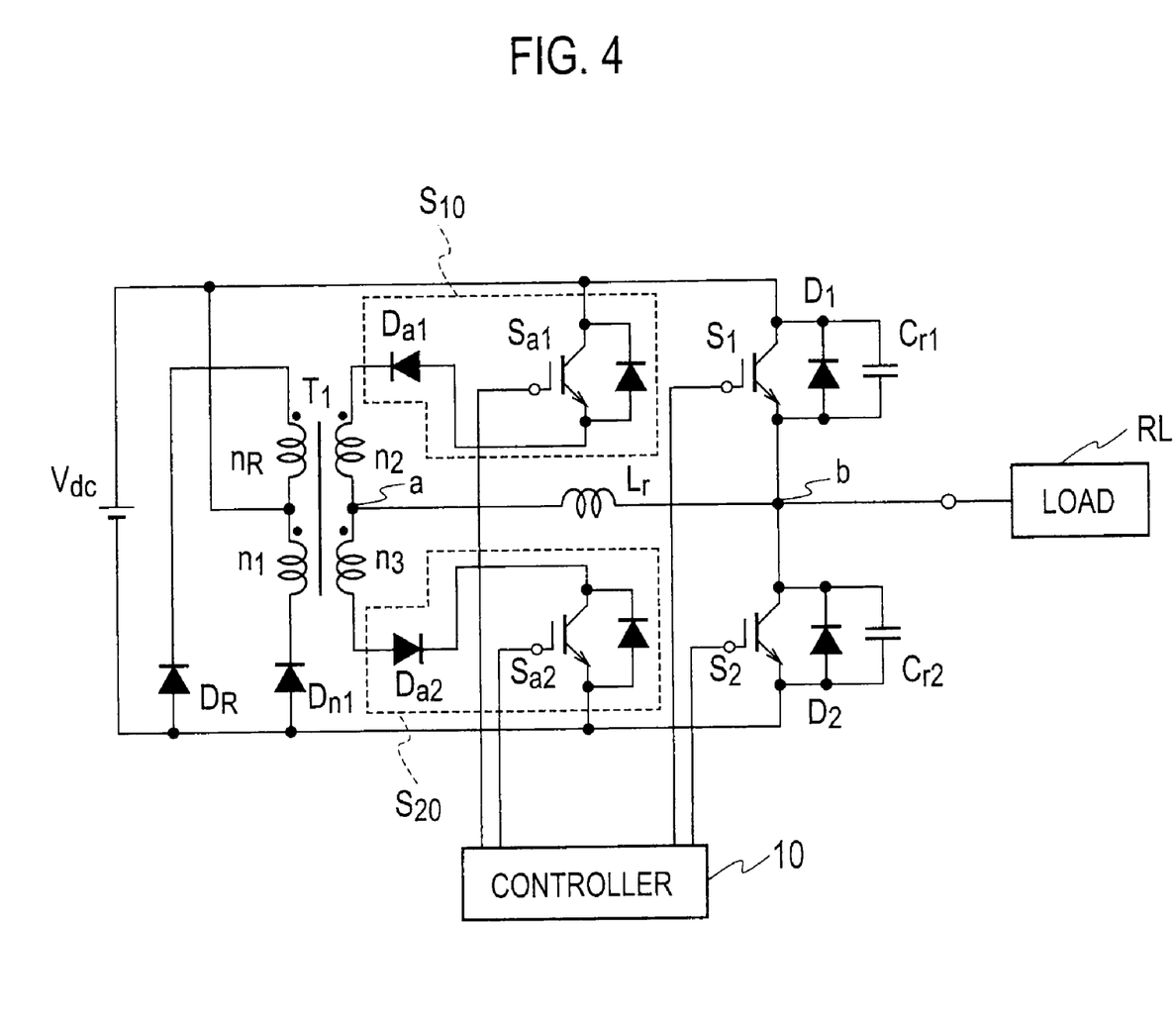
FIG. 4 is a circuit diagram illustrating a resonant power conversion apparatus according to Embodiment 1 of the present invention.

FIG. 4 is a circuit diagram illustrating a resonant power conversion apparatus according to Embodiment 1 of the present invention. This apparatus is an auxiliary resonant commutated pole three-phase voltage inverter employing transformers and FIG. 4 illustrates a one-phase portion of the apparatus.

In FIG. 4, the transformer T1 has a primary winding n1, a secondary winding n2, a tertiary winding n3 connected in series with the secondary winding n2, and a reset winding nR connected in series with the primary winding n1. The reset, primary, secondary, and tertiary windings nR, n1, n2, and n3 of the transformer T1 have a turn ratio of 2:2:1:1.

Ends of a DC power source Vdc are connected to a first series circuit including a switch S1 (first switch) of an insulated gate bipolar transistor and a switch S2 (second switch) of an insulated gate bipolar transistor.

The switch S1 has a collector and an emitter between which a capacitor Cr1 (first capacitor) and a diode D1 (first diode) are connected. The switch S2 has a collector and an emitter between which a capacitor Cr2 (second capacitor) and a diode D2 (second diode) are connected.

The ends of the DC power source Vdc are also connected to a second series circuit including the primary winding n1 of the transformer and a diode Dn1 (third diode), as well as to a third series circuit including the reset winding nR of the transformer T1 and a diode DR (fourth diode).

A connection point "b" of the switches S1 and S2 and a connection point "a" of the secondary and tertiary windings n2 and n3 of the transformer T1 are connected to a reactor Lr. The connection point "b" of the switches S1 and S2 is connected to a load RL.

A positive electrode of the DC power source Vdc and a first end of the secondary winding n2 of the transformer T1 are connected to a switch S10 (first auxiliary switch) that operates in a direction in which a current flows from a positive electrode line of the DC power source Vdc. The switch S10 includes a series circuit of a switch Sa1 (third switch) of an insulated gate bipolar transistor and a diode Da1 (fifth diode).

A negative electrode of the DC power source Vdc and a first end of the tertiary winding n3 of the transformer T1 are connected to a switch S20 (second auxiliary switch) that operates in a direction in which a current flows from a negative electrode line of the DC power source Vdc. The switch S20 includes a series circuit of a switch Sa2 (fourth switch) made of an insulated gate bipolar transistor and a diode Da2 (sixth diode).

The reset winding nR and diode DR form a reset circuit to discharge energy from an exciting inductance of the transformer T1. With the reset circuit, counter electromotive force generated by the exciting inductance of the transformer during an OFF period of the switch Sa1 or Sa2 is returned to the DC power source Vdc, thereby greatly reducing a voltage applied to the switches Sa1 and Sa2.

A controller 10 alternately turns on the switches S1 and S2 and alternately turns on the switches Sa1 and Sa2. More precisely, before a period in which the switches S1 and S2 are both OFF, the controller 10 turns on one of the switches Sa1 and Sa2, to realize a zero-voltage switching operation of the switches S1 and S2 by achieving a resonance of the capacitors Cr1 and Cr2 and reactor Lr during the OFF period of the switches S1 and S2.

Figure 5:
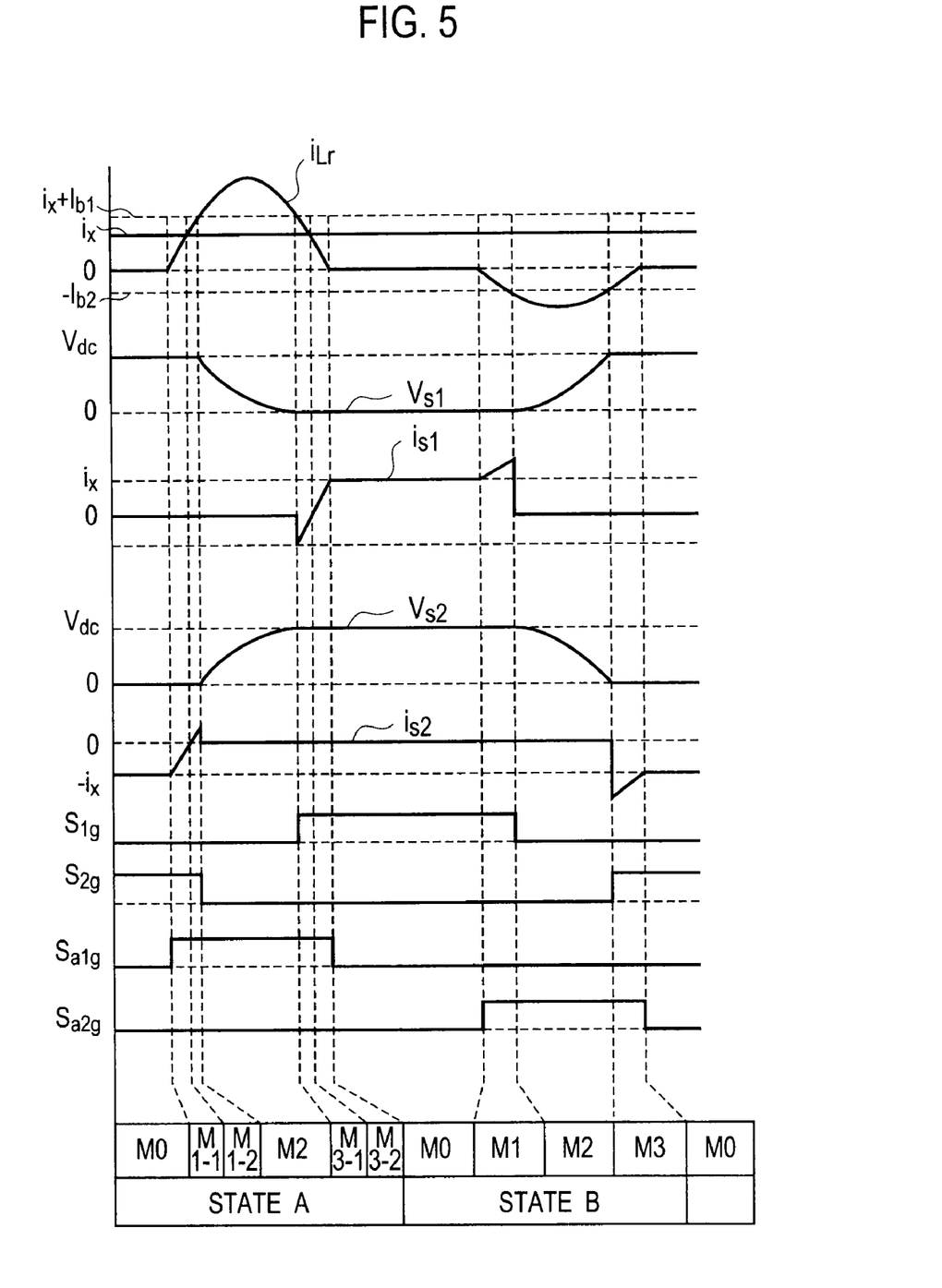
FIG. 5 is a timing chart illustrating operating waveforms in states A and B of Embodiment 1.
Figure 6:
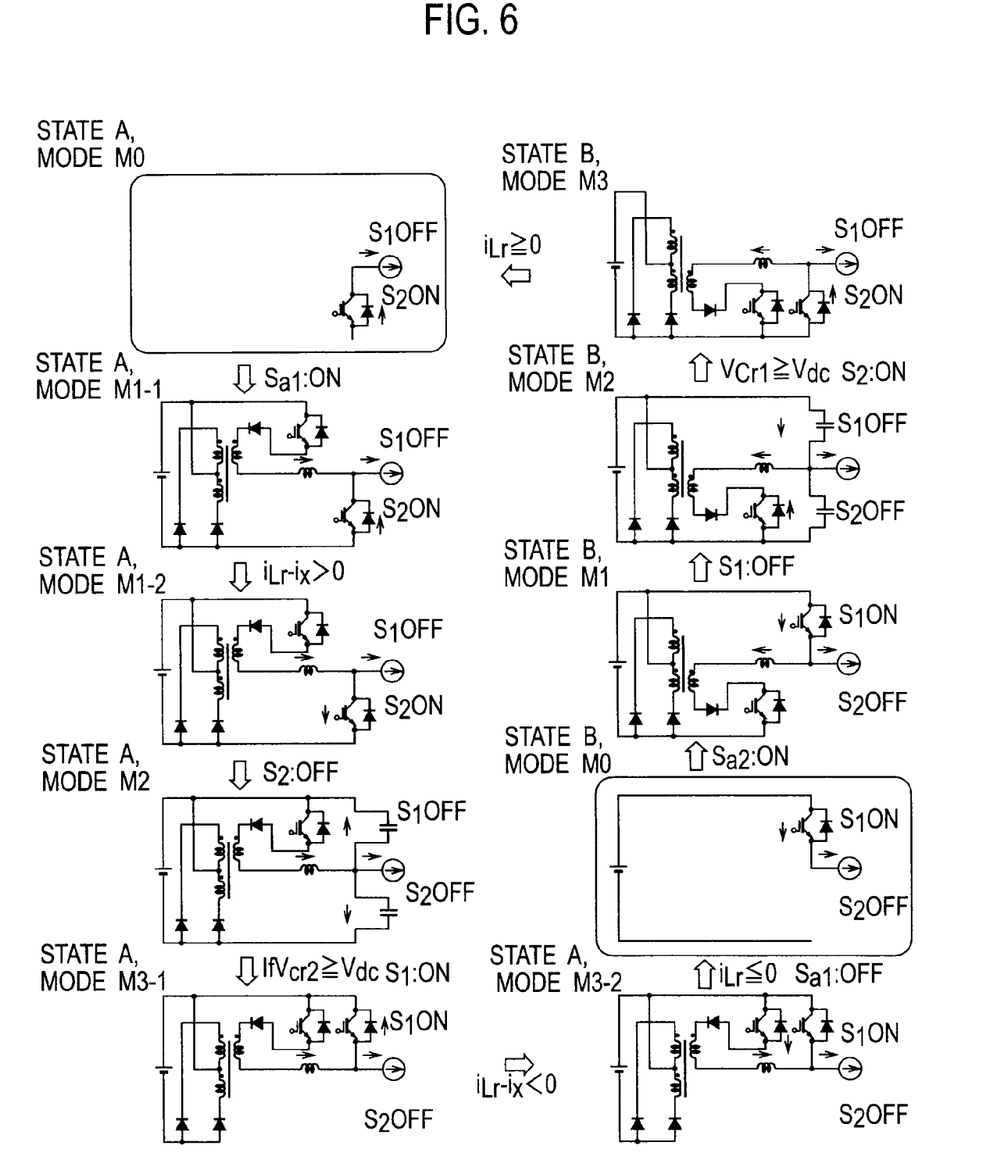
FIG. 6 is a mode transition diagram illustrating states A and B of Embodiment 1.

Operation of the resonant power conversion apparatus according to Embodiment 1 will be explained with reference to FIGS. 5 and 6 in which FIG. 5 illustrates operating waveforms of the apparatus in states A and B and FIG. 6 illustrates mode transition of the apparatus in states A and B. In FIG. 6, only operating parts of the apparatus are illustrated with solid lines.

In FIG. 5, S1g is a gate signal applied to a gate of the switch S1, S2g is a gate signal applied to a gate of the switch S2, Sa1g is a gate signal applied to a gate of the switch Sa1, Sa2g is a gate signal applied to a gate of the switch Sa2, Vdc is a voltage of the DC power source Vdc, iLr is a current passing through the reactor Lr, ix is a current of the load RL, Vs1 is a collector-emitter voltage of the switch S1, Vs2 is a collector-emitter voltage of the switch S2, is1 is a current passing through the switch S1 or the diode D1, is2 is a current passing through the switch S2 or the diode D2.

In mode M0 of state A, the switch S1 is OFF and the switch S2 is ON. The current is2 (negative current) passes through the diode D2 to the load RL. The load current ix has a constant value.

In mode M1-1 of state A, the gate signal Sa1g turns on the switch Sa1, to pass the current iLr through a path extending along Vdc, Sa1, Da1, n2, and Lr. The currents iLr and is2 (negative current) pass through the load RL. At this time, a current passes counterclockwise through a path extending along n1, Vdc, Dn1, and n1. The primary winding n1 receives a voltage from the DC power source Vdc. The primary, secondary, and tertiary windings n1, n2, and n3 have a turn ratio of 2:1:1, and therefore, one half of the voltage of the DC power source Vdc is applied to the connection point "a" of the secondary and tertiary windings n2 and n3. In mode M1-2 of state A, the current iLr exceeds the current ix, and then, the current is2 (positive current), i.e., the difference between the current iLr and the current ix passes through the switch S2.

In mode M2 of state A, the gate signal S2g turns off the switch S2 and the reactor Lr and capacitors Cr1 and Cr2 resonate. At this time, the capacitor Cr2 is charged and the capacitor Cr1 is discharged. This results in increasing the voltage Vs2 across the switch S2 and decreasing the voltage Vs1 across the switch S1.

In mode M3-1 of state A, a voltage Vcr2 across the capacitor Cr2 becomes larger than the voltage Vdc, and then, the diode D1 turns on to pass the current is1 (negative current). At this time, the gate signal S1g turns on the switch 51, thereby realizing the zero-voltage switching of the switch S1. In mode M3-2 of state A, the current iLr becomes smaller than the current ix, and then, the current is1 (positive current), which is obtained by subtracting the current iLr from the current ix, passes through the switch S1.

In mode M0 of state B, the current iLr becomes zero. The gate signal Sa1g turns off the switch Sa1 and only the current is1 passes through the load RL. When the switch Sa1 turns off, the exciting inductance of the transformer T1 produces counter electromotive force, which is returned to the DC power source Vdc through the diode DR and reset winding nR, to greatly reduce a voltage applied to the switch Sa1.

In mode M1 of state B, the gate signal Sa2g turns on the switch Sa2, to pass the current iLr through a path extending along S1, Lr, n3, Da2, and Sa2. This increases the current is1 passing through the switch S1. At this time, a current passes counterclockwise through a path extending along n1, Vdc, Dn1, and n1. The primary winding n1 receives the voltage of the DC power source Vdc. The primary, secondary, and tertiary windings n1, n2, and n3 have a turn ratio of 2:1:1, and therefore, one half of the DC power source voltage Vdc is applied to the connection point "a" of the secondary and tertiary windings n2 and n3.

In mode M2 of state B, the gate signal S1g turns off the switch S1 and the reactor Lr and capacitors Cr1 and Cr2 resonate. At this time, the capacitor Cr1 is charged and the capacitor Cr2 is discharged. This results in increasing the voltage Vs1 across the switch S1 and decreasing the voltage Vs2 across the switch S2.

In mode M3 of state B, a voltage Vcr1 across the capacitor Cr1 becomes larger than the DC power source voltage Vdc and the diode D2 turns on to pass the current is2 (negative current). The gate signal S2g turns on the switch S2 to pass the current is2. In mode M0 of state A, the current iLr becomes zero and the gate signal Sa2g turns off the switch Sa2, so that only the current is2 passes through the load RL. When the switch Sa2 turns off, the exciting inductance of the transformer T1 produces counter electromotive force, which is returned to the DC power source Vdc through the diode DR and reset winding nR, to greatly reduce a voltage applied to the switch Sa2.

Figure 7:
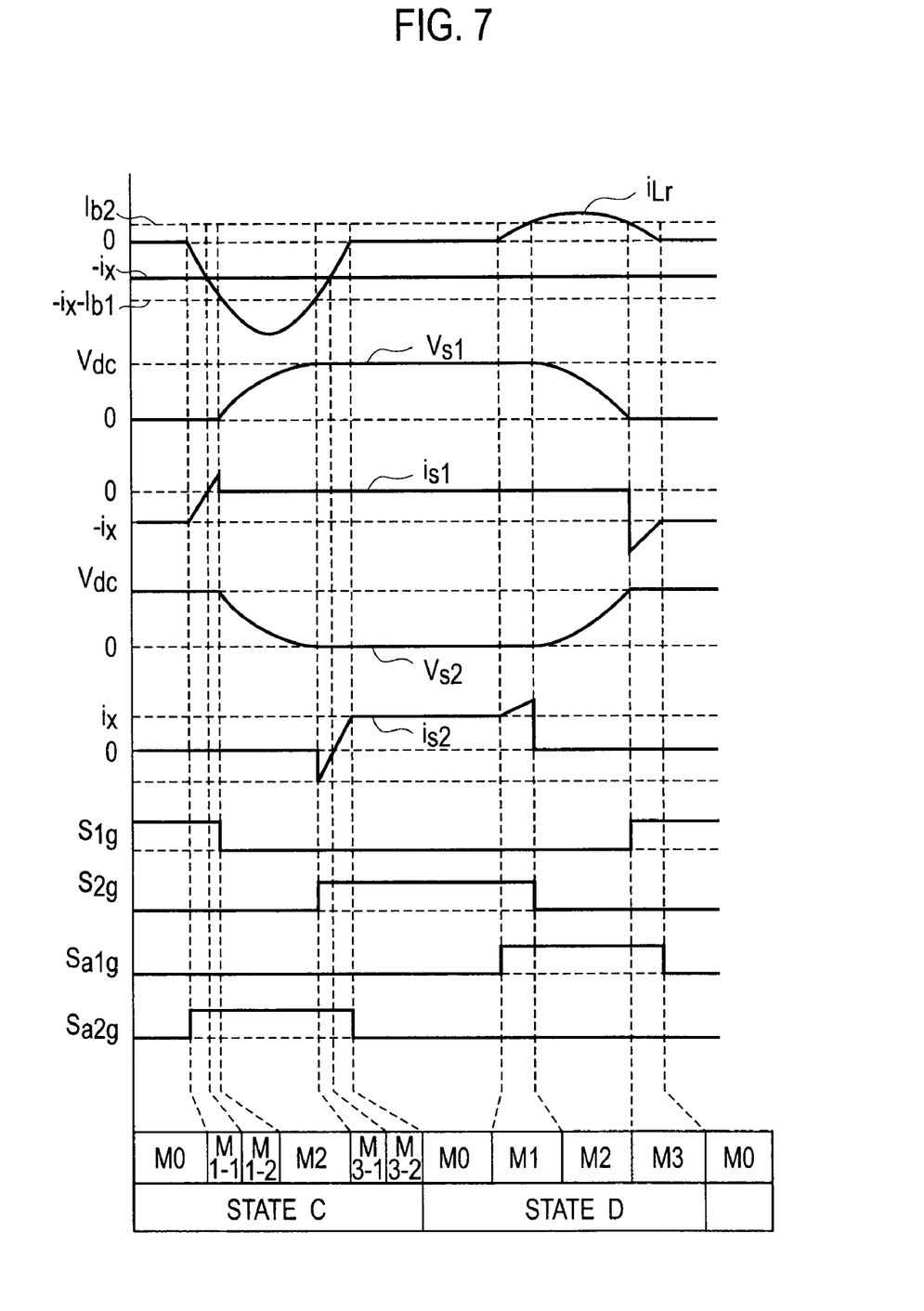
FIG. 7 is a timing chart illustrating operating waveforms in states C and D of Embodiment 1.
Figure 8:
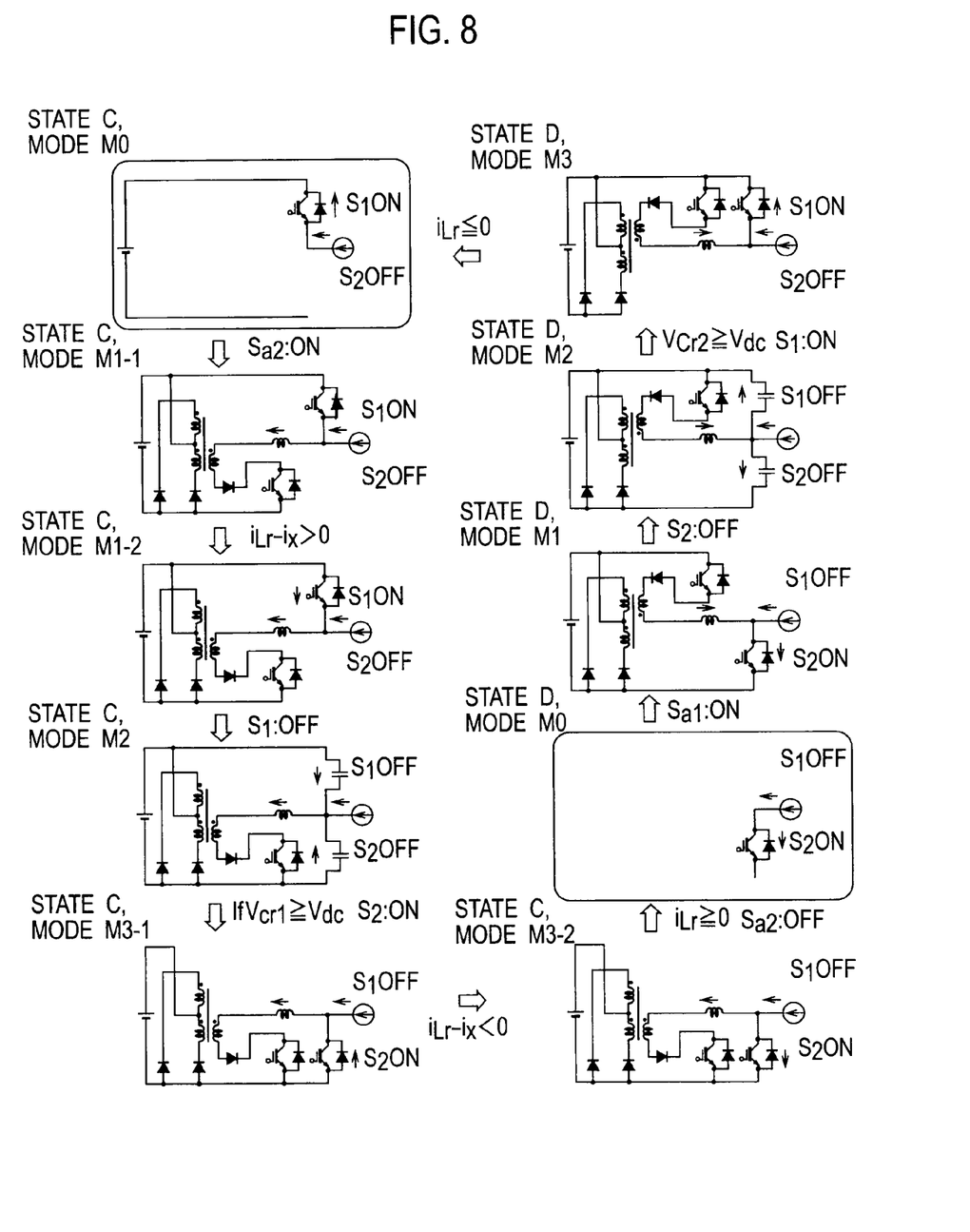
FIG. 8 is a mode transition diagram illustrating states C and D of Embodiment 1.

Operation of the resonant power conversion apparatus of Embodiment 1 in states C and D will be explained in detail with reference to operating waveforms illustrated in FIG. 7 and a mode transition diagram illustrated in FIG. 8. In FIG. 8, only operating parts of the apparatus are illustrated with solid lines.

In mode M0 of state C, the switch S2 is OFF and the switch S1 is ON. The diode D1 passes the current is1 that is the same as the current passing through the load RL. The load current ix has a constant value.

In mode M1-1 of state C, the gate signal Sa2g turns on the switch Sa2 to pass the current iLr through the path extending along Lr, n3, Da2, and Sa2. The current ix is divided into the currents iLr and is2. At this time, a current passes counterclockwise through the path extending along n1, Vdc, Dn1, and n1. The primary winding n1 receives the DC power source voltage Vdc. The primary, secondary, and tertiary windings n1, n2, and n3 have a turn ratio of 2:1:1, and therefore, one half of the DC power source voltage Vdc is applied to the connection point "a" of the secondary and tertiary windings n2 and n3. In mode M1-2 of state C, the current iLr becomes larger than the current ix and the current is1 (positive current), which is obtained by subtracting the current ix from the current iLr, passes through the switch S1.

In mode M2 of state C, the gate signal S1g turns off the switch S1 and the reactor Lr and capacitors Cr1 and Cr2 resonate. At this time, the capacitor Cr1 is charged and the capacitor Cr2 is discharged. This results in increasing the voltage Vs1 across the switch S1 and decreasing the voltage Vs2 across the switch S2.

In mode M3-1 of state C, the voltage Vcr1 across the capacitor Cr1 becomes larger than the power source voltage Vdc and the diode D2 turns on to pass the current is2 through the diode D2. At this time, the gate signal S2g turns on the switch S2, thereby realizing the zero-voltage switching of the switch S2. In mode M3-2 of state C, the current iLr becomes smaller than the current ix and the current is2, which is obtained by subtracting the current iLr from the current ix, passes through the switch S2.

In mode M0 of state D, the current iLr becomes zero and the gate signal Sa2g turns off the switch Sa2, so that only the current is2 passes through the load RL. When the switch Sa2 turns off, the exciting inductance of the transformer T1 produces counter electromotive force, which is returned to the DC power source Vdc through the diode DR and reset winding nR, to greatly reduce a voltage applied to the switch Sa2.

In mode M1 of state D, the gate signal Sa1g turns on the switch Sa1 and the current iLr passes through a path extending along Sa1, Da1, n2, Lr, and S2, to increase the current is2 of the switch S2. At this time, a current passes counterclockwise through the path extending along n1, Vdc, Dn1, and n1. The primary winding n1 receives the DC power source voltage Vdc. The primary, secondary, and tertiary windings n1, n2, and n3 have a turn ratio of 2:1:1, and therefore, one half of the voltage of the DC power source Vdc is applied to the connection point "a" of the secondary and tertiary windings n2 and n3.

In mode M2 of state D, the gate signal S2g turns off the switch S2 and the reactor Lr and capacitors Cr1 and Cr2 resonate. At this time, the capacitor Cr2 is charged and the capacitor Cr1 is discharged. This results in increasing the voltage Vs2 across the switch S2 and decreasing the voltage Vs1 across the switch S1.

In mode M3 of state D, the voltage Vcr2 across the capacitor Cr2 becomes larger than the voltage Vdc and the diode D1 turns on to pass the current is1. The gate signal S1g turns on the switch S1, to pass the current is1. In mode M0 of state C, the current iLr becomes zero. The gate signal Sa1g turns off the switch Sa1 and only the current is1 passes through the load RL. When the switch Sa1 turns off, the exciting inductance of the transformer T1 produces counter electromotive force, which is returned to the DC power source Vdc through the diode DR and reset winding nR, to greatly reduce a voltage applied to the switch Sa1.

As mentioned above, the resonant power conversion apparatus according to Embodiment 1 employs the transformer T1 instead of the two voltage dividing capacitors C1 and C2 of the related art illustrated in FIG. 1, to achieve performance equivalent to that achieved with the capacitors of the related art. According to Embodiment 1, the primary, secondary, and tertiary windings n1, n2, and n3 of the transformer T1 have a turn ratio of 2:1:1, and therefore, one half of the DC voltage Vdc is applied to the connection point "a" of the secondary and tertiary windings n2 and n3.

When one of the switches Sa1 and Sa2 is OFF, the exciting inductance of the transformer T1 produces counter electromotive force, which is returned to the DC power source Vdc through the diode DR and reset winding nR, to greatly reduce a voltage applied to the switches Sa1 and Sa2. This prevents the switches Sa1 and Sa2 from deteriorating or breaking, elongates the service life of the switches Sa1 and Sa2, and improves the reliability of the resonant power conversion apparatus.

If there is no diode DR nor reset winding nR, the counter electromotive force produced by the exciting inductance of the transformer T1 during an OFF period of any one of the switches Sa1 and Sa2 causes the secondary and tertiary windings n2 and n3 to generate voltages. These voltages are surge voltages applied to the switches Sa1 and Sa2, to break the switches Sa1 and Sa2. This problem never occurs in the resonant power conversion apparatus of Embodiment 1.

Embodiment 2

Figure 9:
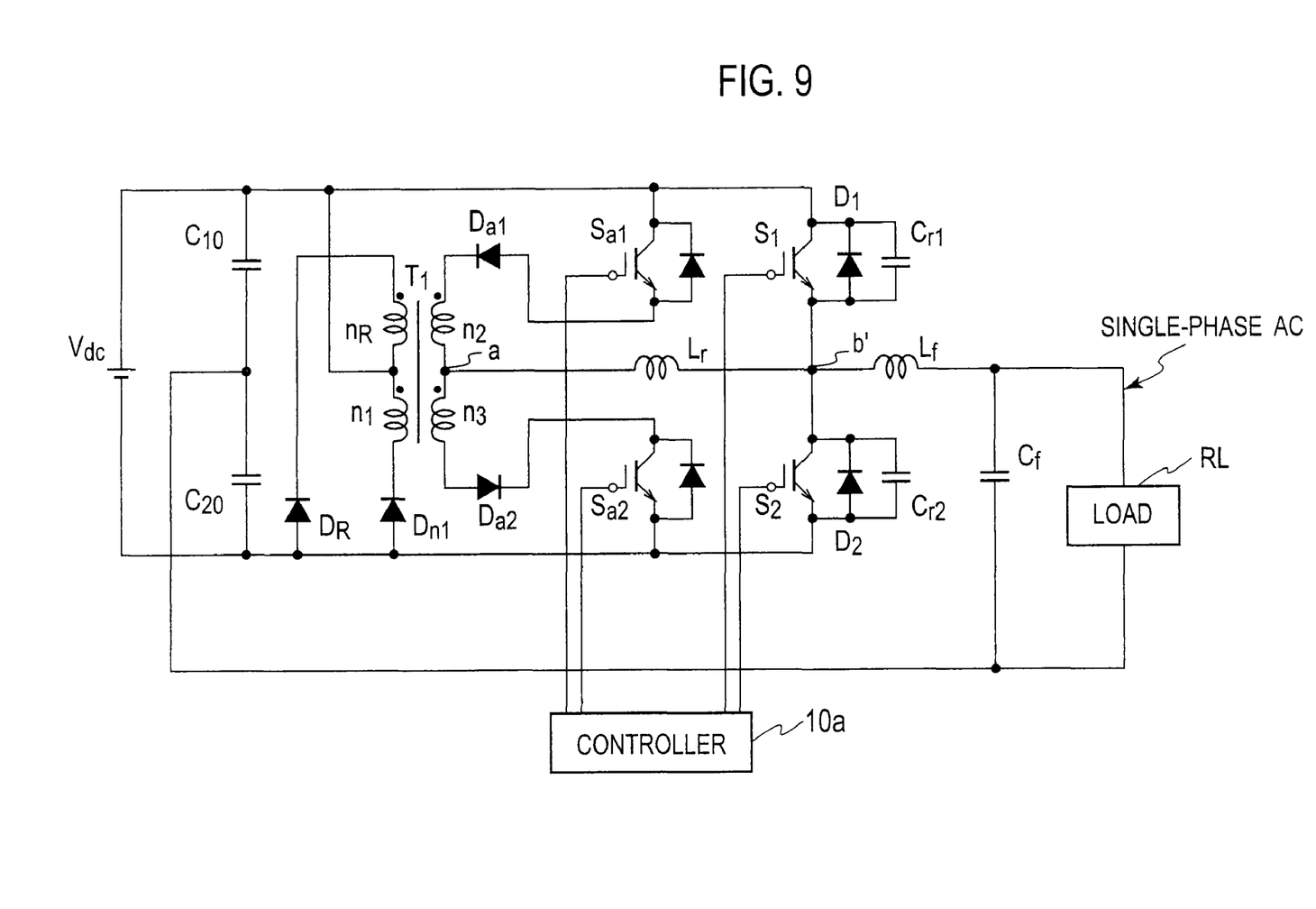
FIG. 9 is a circuit diagram illustrating a resonant power conversion apparatus according to Embodiment 2 of the present invention.

FIG. 9 is a circuit diagram illustrating a resonant power conversion apparatus according to Embodiment 2 of the present invention. This is a half-bridge resonant power conversion apparatus. Compared with Embodiment 1 illustrated in FIG. 4, Embodiment 2 additionally employs capacitors C10 and C20, a reactor Lf, and a capacitor Cf.

Both ends of a DC power source Vdc are connected to a series circuit including the capacitors C10 and C20. Connected between a connection point of the capacitors C10 and C20 and a connection point "b'" of switches S1 and S2 is a series circuit (a harmonics removing filter circuit) including the reactor Lf and capacitor Cf. Both ends of the capacitor Cf are connected to a load RL, to provide the load RL with single-phase sinusoidal AC power. Effect of Embodiment 2 is similar to that of Embodiment 1.

Embodiment 3

Figure 10:
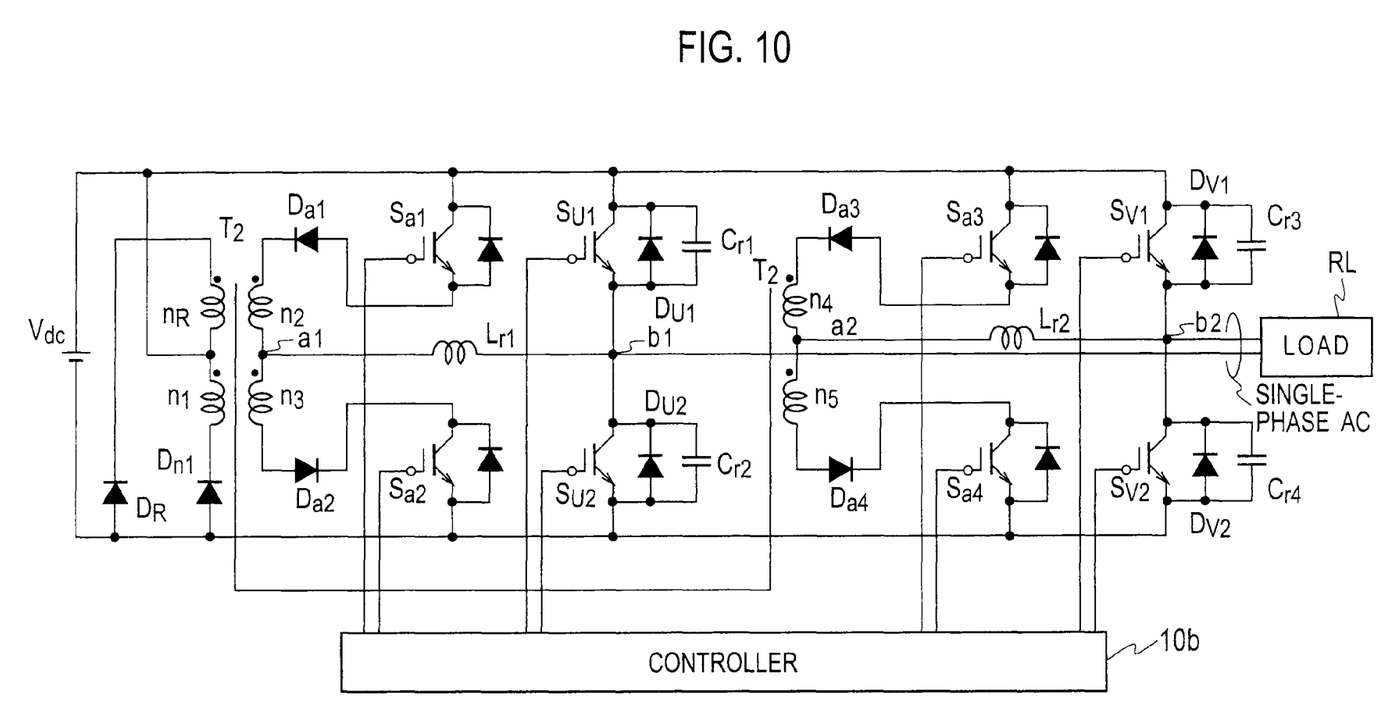
FIG. 10 is a circuit diagram illustrating a resonant power conversion apparatus according to Embodiment 3 of the present invention.

FIG. 10 is a circuit diagram illustrating a resonant power conversion apparatus according to Embodiment 3 of the present invention. Embodiment 3 employs a single-phase, full-bridge configuration with respect to Embodiment 2 that employs a half-bridge configuration as illustrated in FIG. 9.

Namely, the resonant power conversion apparatus of Embodiment 3 includes a transformer T2 provided with a primary winding n1, secondary windings n2 and n4, tertiary windings n3 and n5, and a reset winding nR and diodes DR and Dn1. In addition, the apparatus of Embodiment 3 employs, for U-phase, switches SU1, SU2, Sa1 and Sa2, diodes Da1 and Da2, capacitors Cr1 and Cr2, and a reactor Lr1, and for V-phase, switches SV1, SV2, Sa3, and Sa4, diodes Da3 and Da4, capacitors Cr3 and Cr4, and a reactor Lr2.

A controller 10b has the same function as the controller 10 of Embodiment 1 and controls ON/OFF of the switches SU1, SU2, Sa1 and Sa2 and the switches SV1, SV2, Sa3, and Sa4.

Effect of Embodiment 3 is similar to that of Embodiment 1.

Embodiment 4

Figure 11:
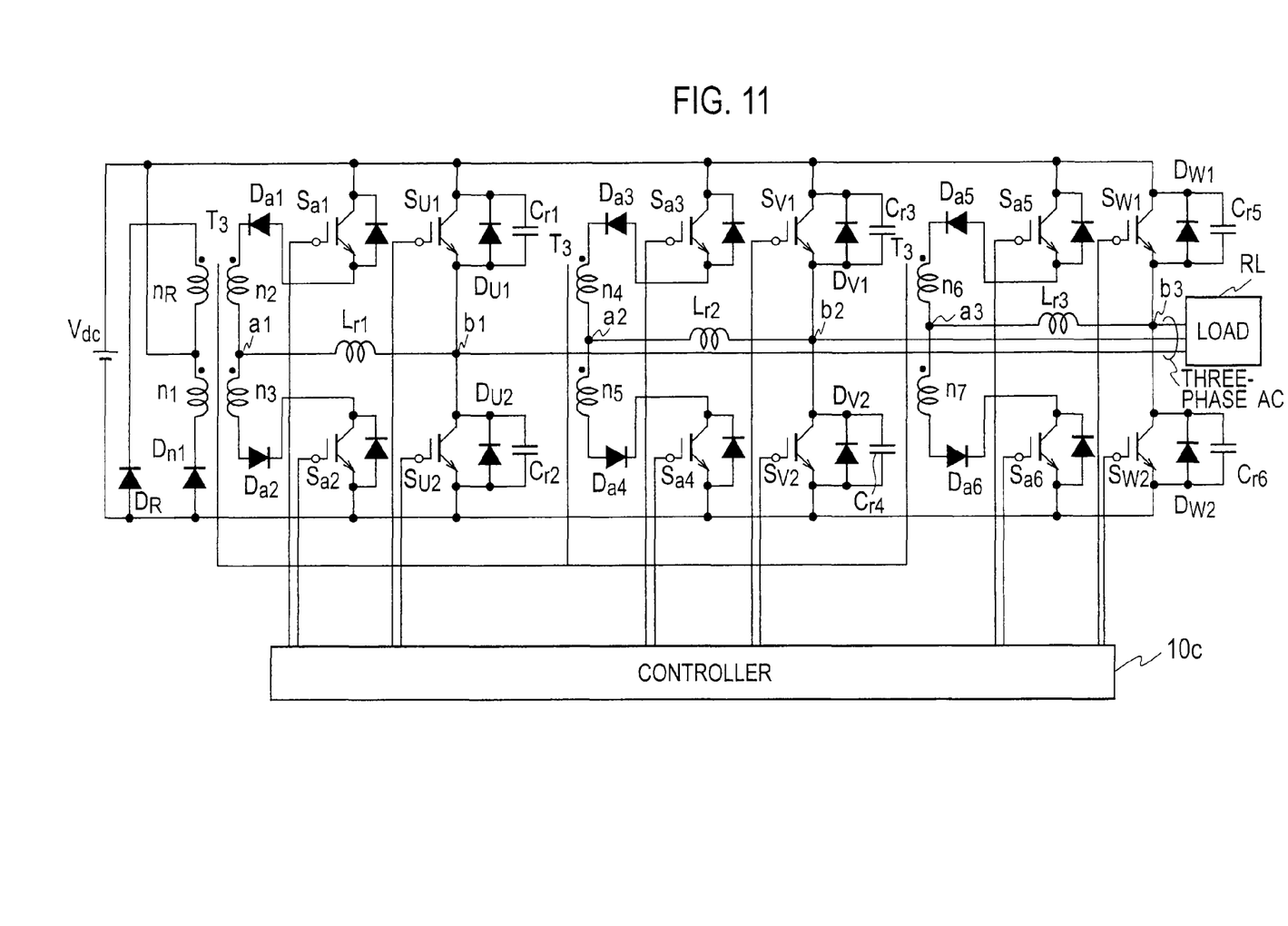
FIG. 11 is a circuit diagram illustrating a resonant power conversion apparatus according to Embodiment 4 of the present invention.

FIG. 11 is a circuit diagram illustrating a resonant power conversion apparatus according to Embodiment 4 of the present invention. Embodiment 4 employs a three-phase, full-bridge configuration with respect to Embodiment 1 that employs a one-phase configuration as illustrated in FIG. 4.

Namely, the resonant power conversion apparatus of Embodiment 4 includes a transformer T3 provided with a primary winding n1, secondary windings n2, n4, and n6, tertiary windings n3, n5, and n7, and a reset winding nR and diodes DR and Dn1. In addition, the apparatus of Embodiment 4 includes, for U-phase, switches SU1, SU2, Sa1, and Sa2, diodes Da1 and Da2, capacitors Cr1 and Cr2, and a reactor Lr1, for V-phase, switches SV1, SV2, Sa3, and Sa4, diodes Da3 and Da4, capacitors Cr3 and Cr4, and a reactor Lr2, and for W-phase, switches SW1, SW2, Sa5, and Sa6, diodes Da5 and Da6, capacitors Cr5 and Cr6, and a reactor Lr3.

A controller 10c has the same function as the controller 10 of Embodiment 1 and controls ON/OFF of the switches SU1, SU2, Sa1, and Sa2, switches SV1, SV2, Sa3, and Sa4, and switches SW1, SW2, Sa5, and Sa6.

Effect of Embodiment 4 is similar to that of Embodiment 1.

The present invention is not limited to the resonant power conversion apparatuses of Embodiments 1 to 4. According to Embodiment 1, the gate signal Sa1g to the switch Sa1 is ON in modes M1, M2, and M3 of state A and modes M1, M2, and M3 of state D and the gate signal Sa2g to the switch Sa2 is ON in modes M1, M2, and M3 of state B and modes M1, M2, and M3 of state C. Instead, the gate signal Sa1g to the switch Sa1 may be ON in modes M1, M2, and M3 of state A, mode M0 of state B, modes M1, M2, and M3 of state D, and mode M0 of state C and the gate signal Sa2g to the switch Sa2 is ON in modes M1, M2, M3 of state B, mode M0 of state A, modes M1, M2, and M3 of state C, and mode M0 of state D. This configuration may provides an effect similar to that of Embodiment 1.

As mentioned above, the resonant power conversion apparatus according to the present invention employs a transformer instead of two voltage dividing capacitors, to realize performance equivalent to that realized by the capacitors. Even if the exciting inductance of the transformer produces counter electromotive force during an OFF period of the first or second auxiliary switch, the present invention returns the counter electromotive force to a DC power source through the fourth diode and reset winding, to greatly reduce a voltage applied to the first and second auxiliary switches. The resonant power conversion apparatus according to the present invention, therefore, has long service life and high reliability.

The present invention is applicable to, for example, inverters for electric vehicles.

This application claims benefit of priority under 35 USC §119 to Japanese Patent Application No. 2009-199505, filed on Aug. 31, 2009, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A resonant power conversion apparatus comprising:
a transformer having a primary winding, a secondary winding, a tertiary winding connected in series with the secondary winding, and a reset winding connected in series with the primary winding;
a first series circuit connected between first and second ends of a DC power source and including a first switch and a second switch;
a first capacitor and a first diode that are connected in parallel with the first switch;
a second capacitor and a second diode that are connected in parallel with the second switch;
a second series circuit connected between the first and second ends of the DC power source and including the primary winding of the transformer and a third diode;
a third series circuit connected between the first and second ends of the DC power source and including the reset winding of the transformer and a fourth diode;
a reactor connected between a connection point of the first and second switches and a connection point of the secondary and tertiary windings of the transformer;
a first auxiliary switch connected between the first end of the DC power source and a first end of the secondary winding of the transformer;
a second auxiliary switch connected between the second end of the DC power source and a first end of the tertiary winding of the transformer; and
a controller configured to alternately turn on the first and second switches and alternately turn on the first and second auxiliary switches, so that the first and second switches each conduct a zero-voltage switching operation.

2. The resonant power conversion apparatus of claim 1, wherein:
the first auxiliary switch is a series circuit including a third switch and a fifth diode that are connected in series; and
the second auxiliary switch is a series circuit including a fourth switch and a sixth diode that are connected in series.

3. The resonant power conversion apparatus of claim 1, wherein
the reset, primary, secondary, and tertiary windings of the transformer have a turn ratio of 2:2:1:1.

4. The resonant power conversion apparatus of claim 2, wherein
the reset, primary, secondary, and tertiary windings of the transformer have a turn ratio of 2:2:1:1.

5. The resonant power conversion apparatus of claim 1, wherein
the resonant power conversion apparatus employs a configuration selected from the group consisting of a half-bridge configuration, a single-phase, full-bridge configuration, and a three-phase, full-bridge configuration, to supply AC power to a load.

6. The resonant power conversion apparatus of claim 2, wherein the resonant power conversion apparatus employs a configuration selected from the group consisting of a half-bridge configuration, a single-phase, full-bridge configuration, and a three-phase, full-bridge configuration, to supply AC power to a load.

* * * * *

UNITED STATES PATENT AND TRADEMARK OFFICE
CERTIFICATE OF CORRECTION

PATENT NO. : 8,300,428 B2
APPLICATION NO. : 12/861327
DATED : October 30, 2012
INVENTOR(S) : Hiromitsu Terui et al.

Page 1 of 1

It is certified that error appears in the above-identified patent and that said Letters Patent is hereby corrected as shown below:

On the title page, Item (73), the first Assignee's City of Residence is incorrect. Item (73), should read:

--(73) Assignees: Sanken Electric Co., Ltd., Niiza-shi (JP); National University Corporation Shimane University, Matsue-shi (JP)--

Signed and Sealed this
First Day of January, 2013

David J. Kappos
*Director of the United States Patent and Trademark Office*